United States Patent [19]
Melind

[11] 3,878,743
[45] Apr. 22, 1975

[54] CAN SHEARING APPARATUS
[75] Inventor: Julius J. Melind, Des Plaines, Ill.
[73] Assignee: H. L. Fisher Mfg. Co., Inc., Des Plaines, Ill.
[22] Filed: Dec. 17, 1973
[21] Appl. No.: 425,559

[52] U.S. Cl. .................. 82/54; 82/101; 82/102
[51] Int. Cl. ............................................ B23b 3/04
[58] Field of Search .................. 82/82, 101, 47, 54; 72/328; 90/20

[56] References Cited
UNITED STATES PATENTS

| | | | |
|---|---|---|---|
| 2,702,597 | 2/1955 | Wickwire et al. | 82/54 |
| 3,400,620 | 9/1968 | Armbruster et al. | 82/54 X |
| 3,425,251 | 2/1969 | Maytag | 72/328 |
| 3,481,233 | 12/1969 | Yann et al. | 90/20 X |
| 3,646,840 | 3/1972 | Bozek | 82/82 |
| 3,714,854 | 2/1973 | Kubacki | 82/101 R |
| 3,750,501 | 8/1973 | Miller | 82/59 |

Primary Examiner—Andrew R. Juhasz
Assistant Examiner—W. R. Briggs
Attorney, Agent, or Firm—Johnson, Dienner, Emrich & Wegner

[57] ABSTRACT

The apparatus includes a spindle unit having a horizontal axis, an annular cutter element secured to the spindle unit, means for supporting a can with the open end thereof disposed over the annular cutter element, and a stationary cutter element. The spindle unit is rotated on its horizontal axis while it is revolved in a circular path whereby the annular and stationary cutter elements cooperate for shearing an end portion from the open end of a can disposed over the annular cutter element.

18 Claims, 14 Drawing Figures

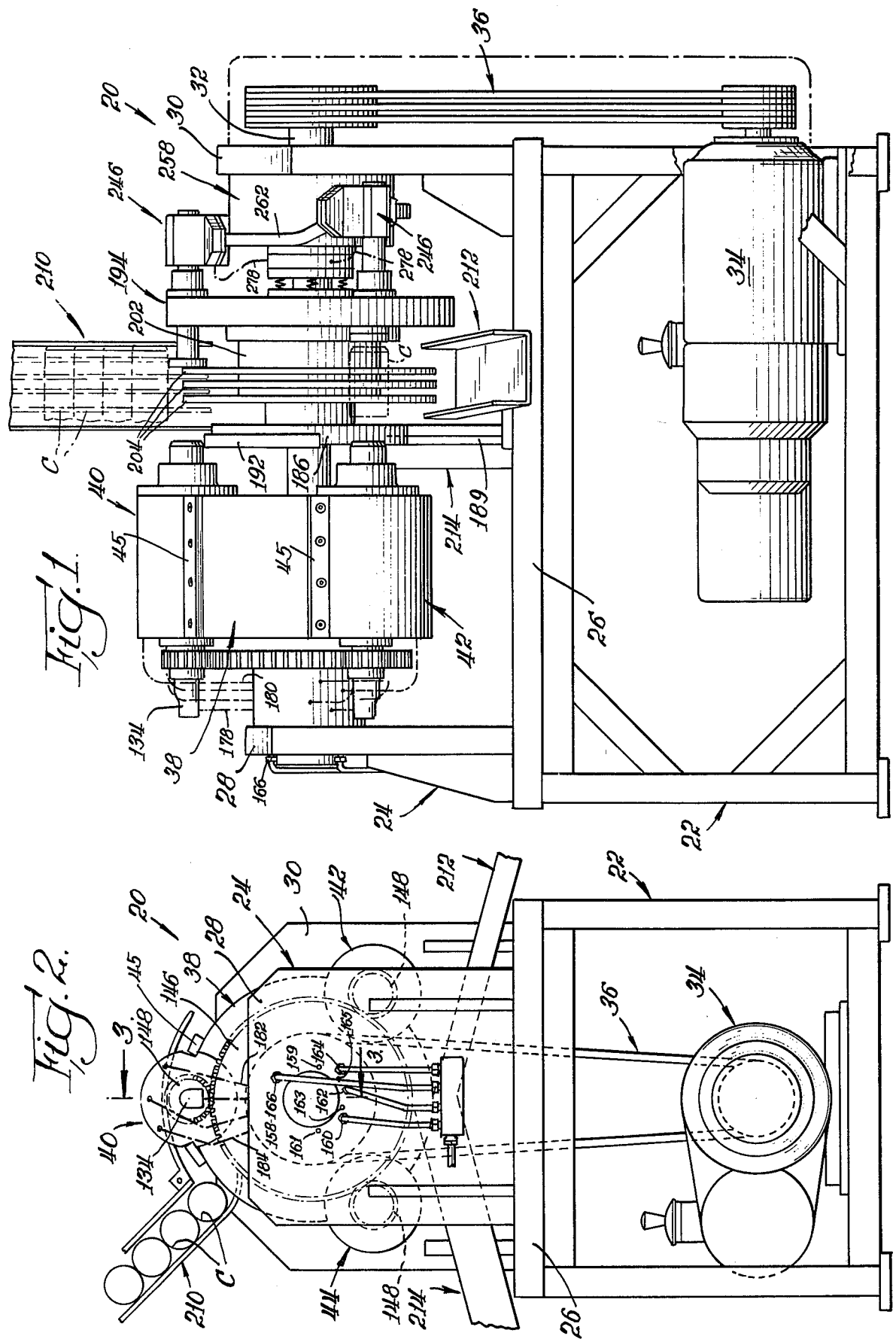

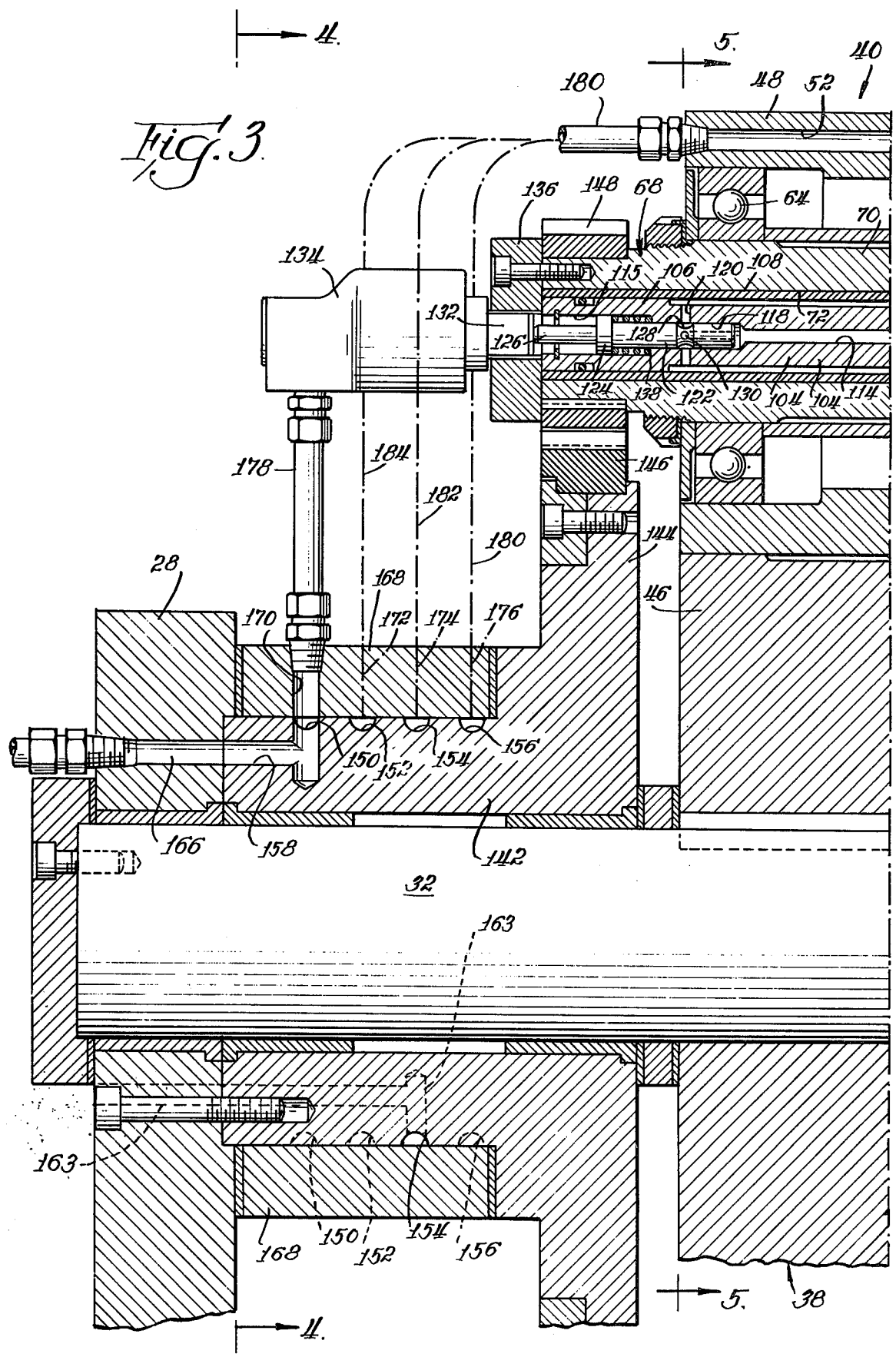

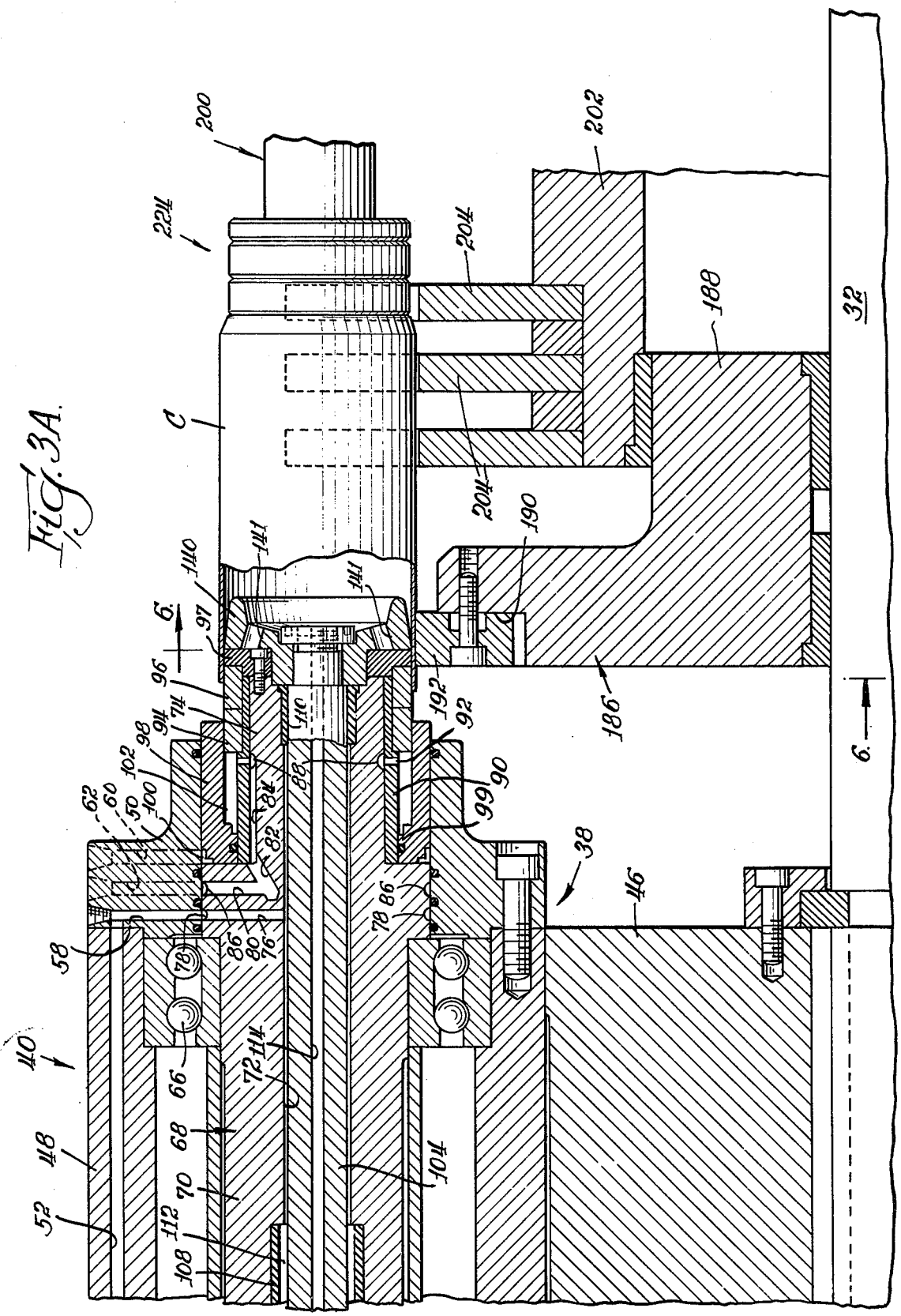

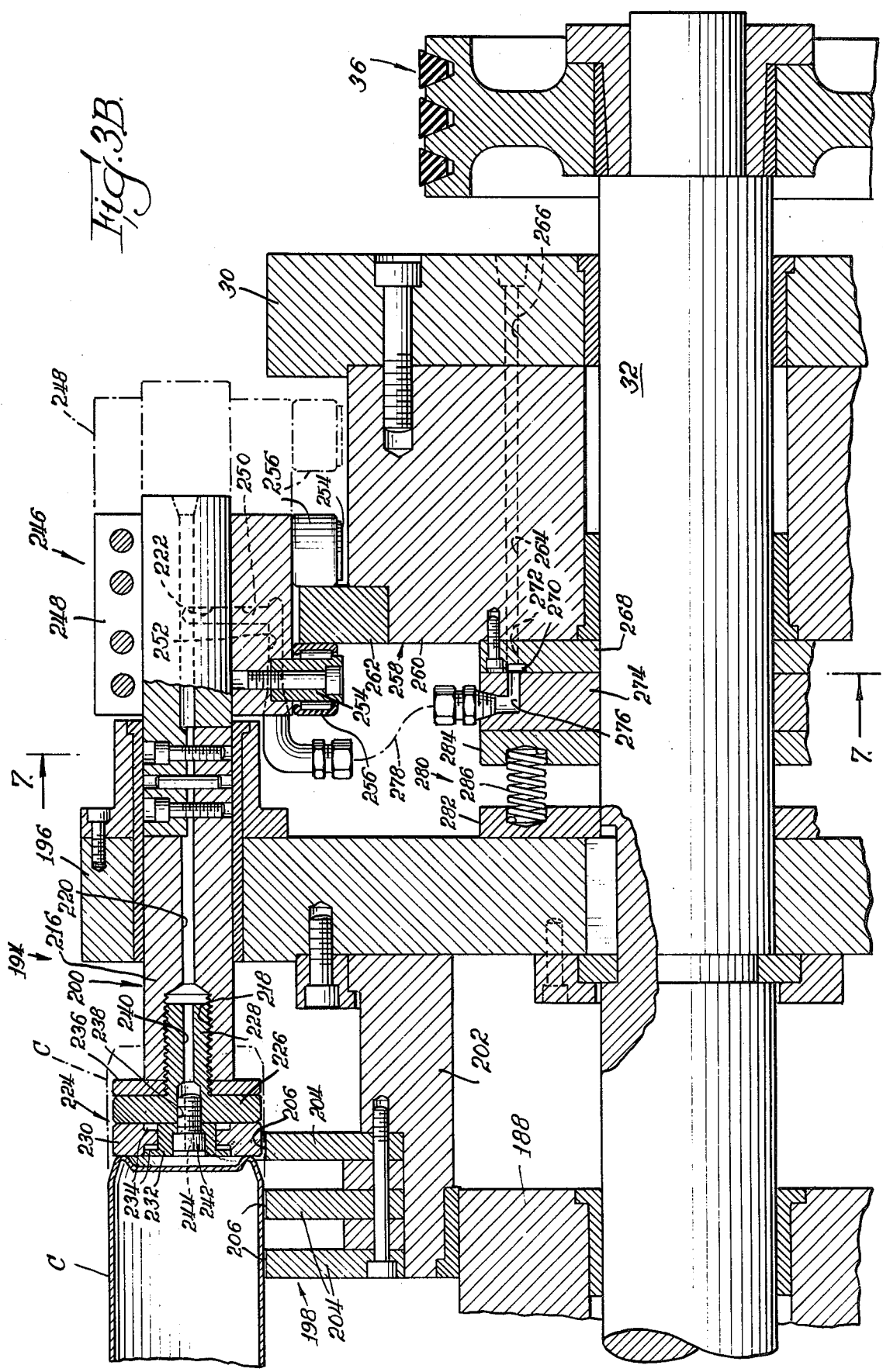

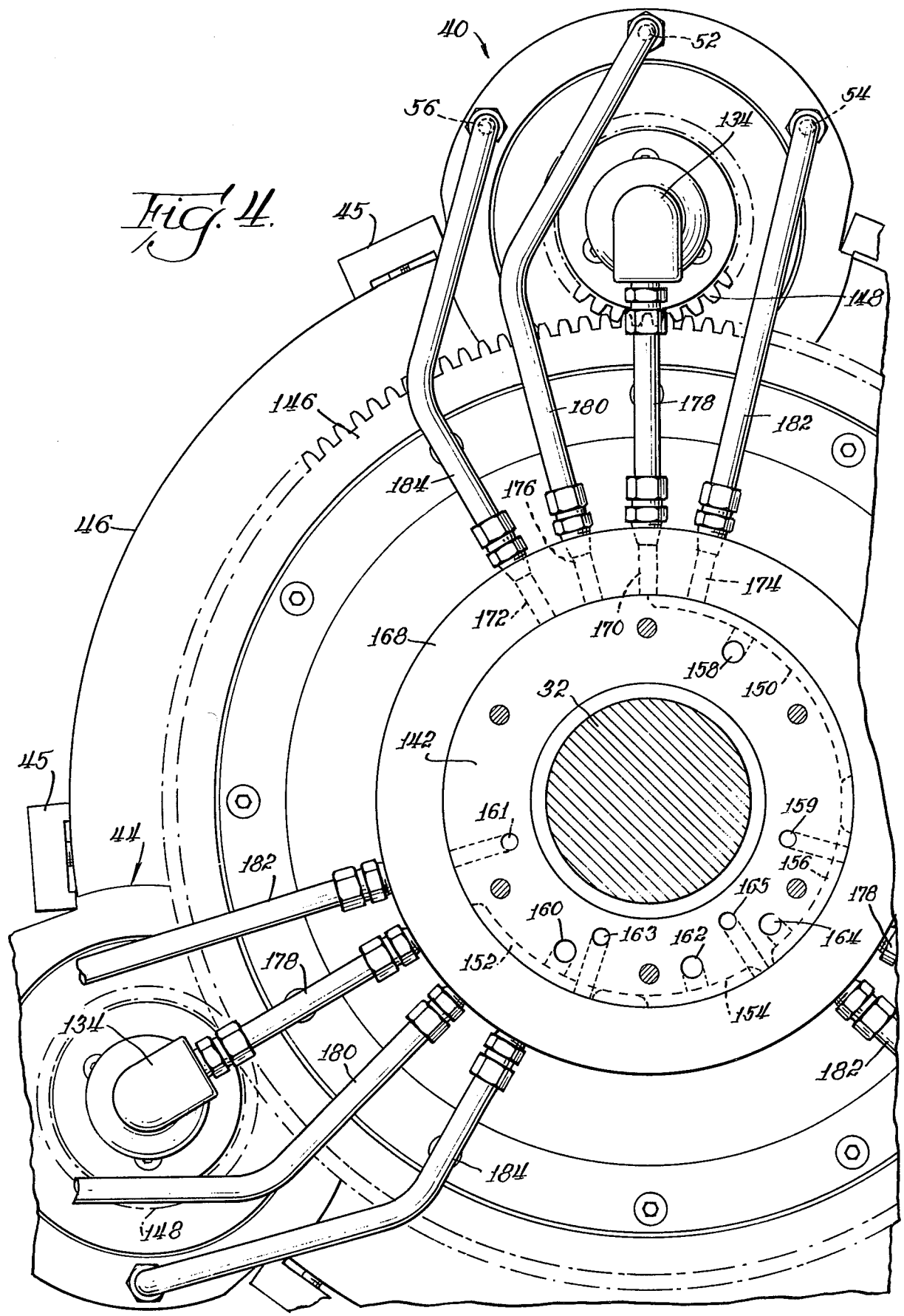

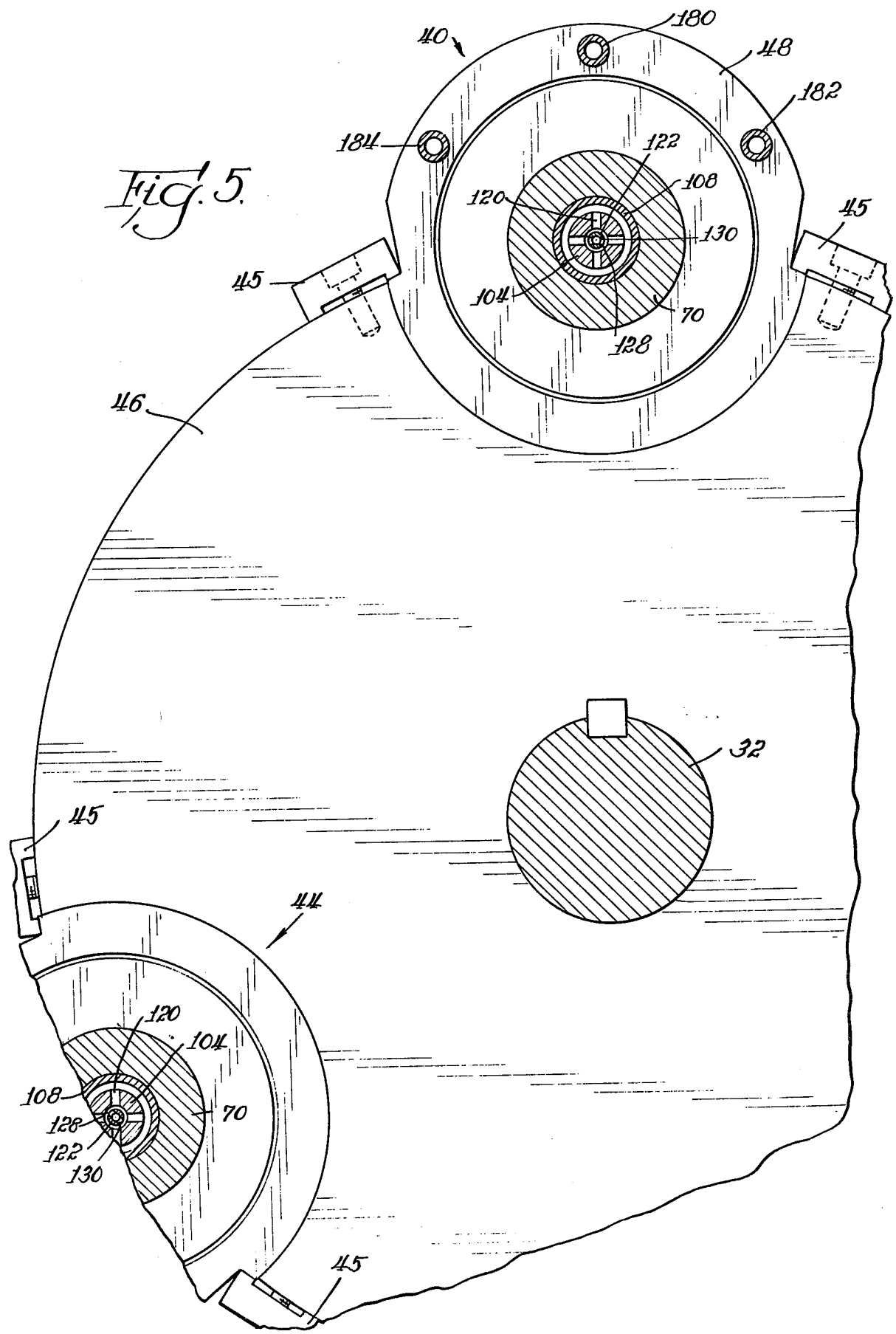

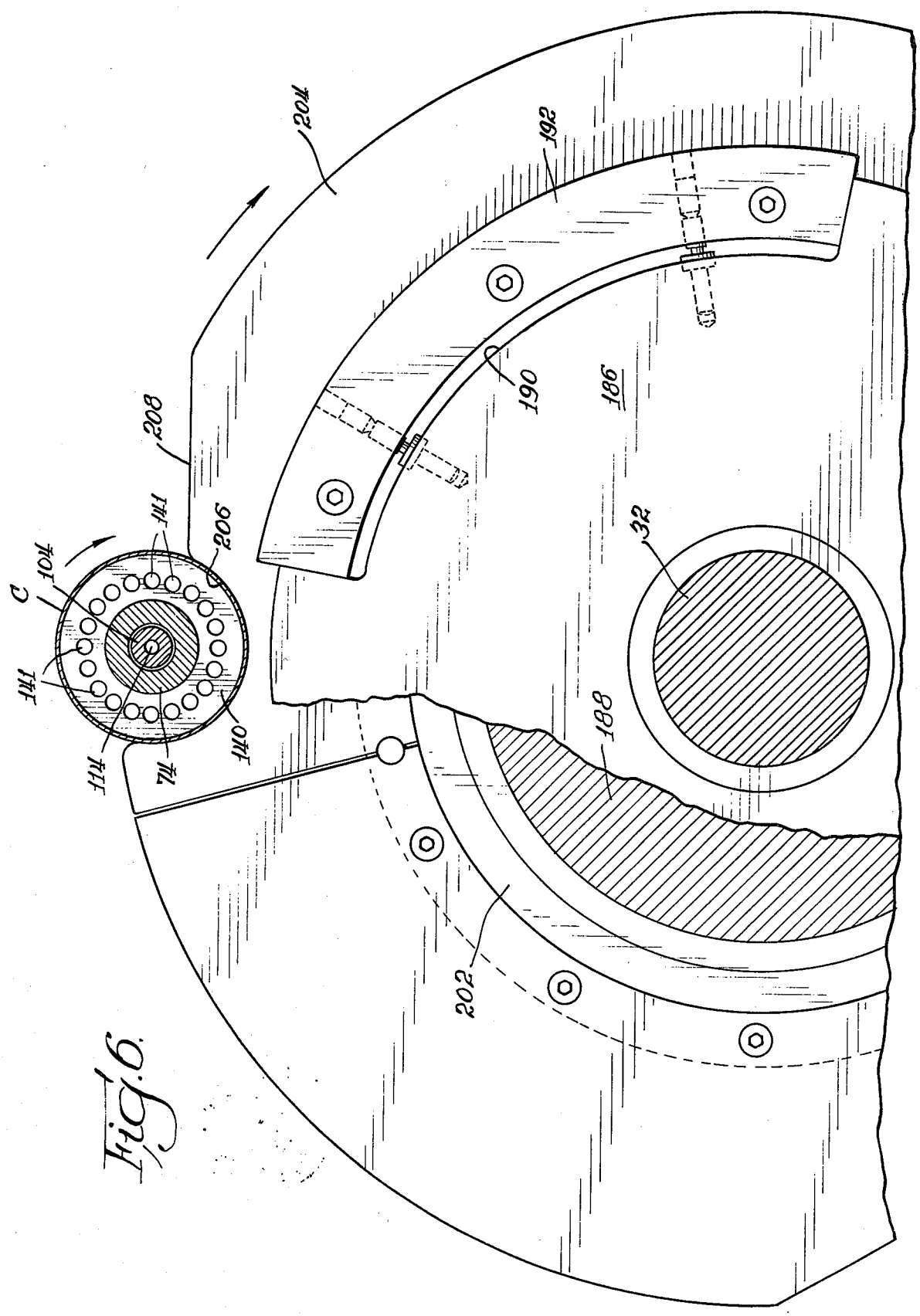

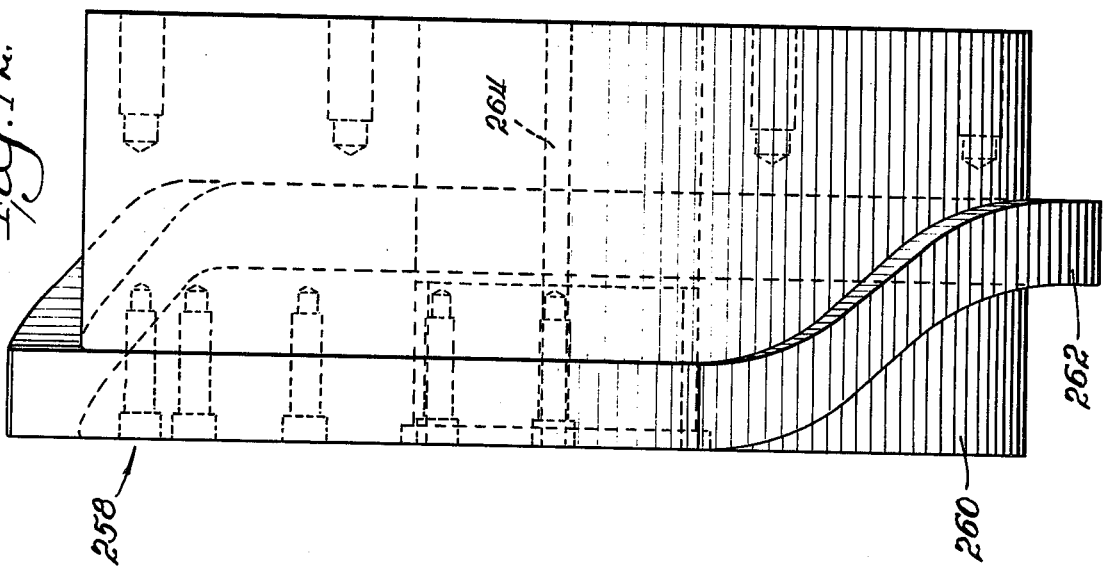
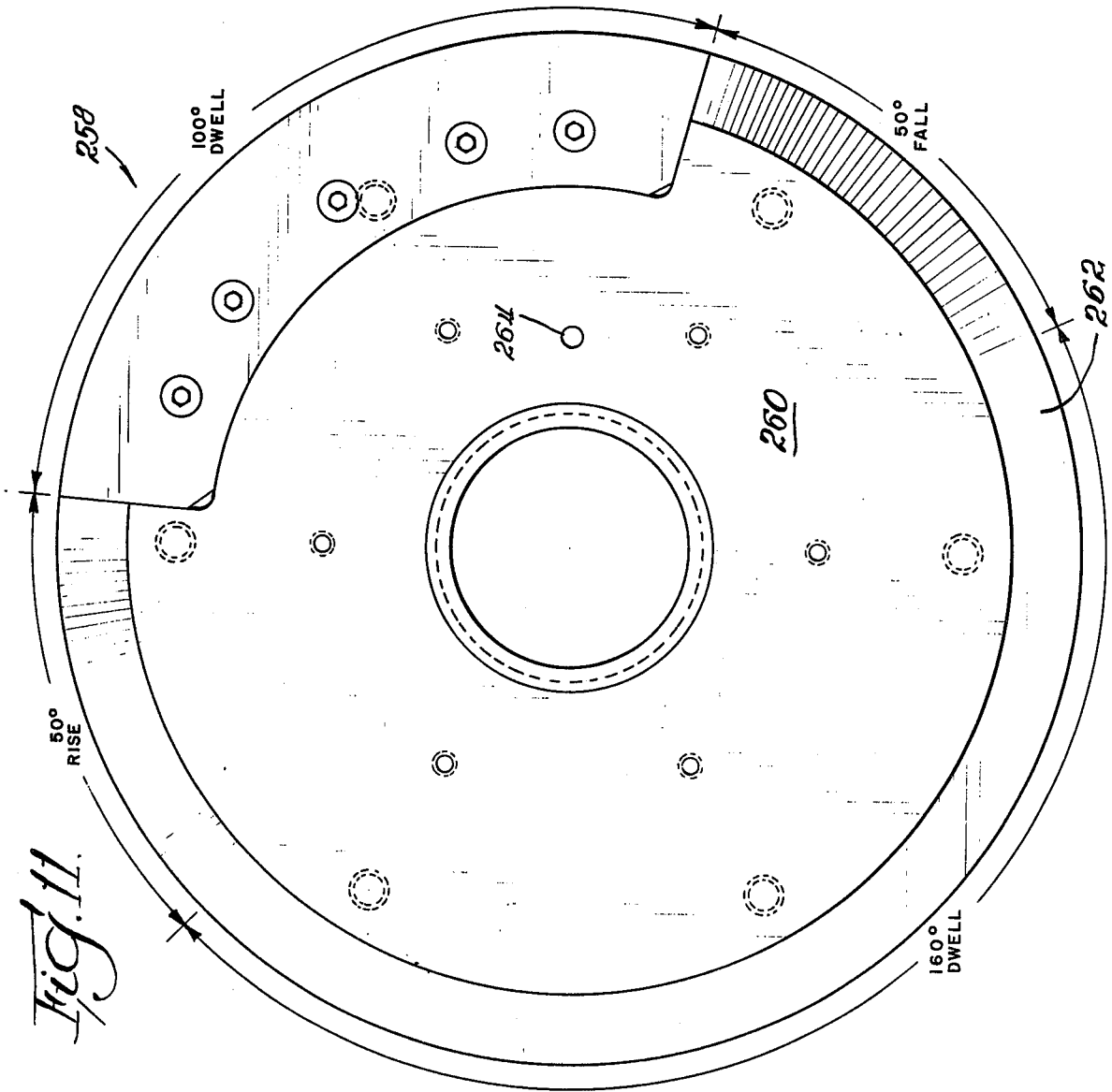

CAN SHEARING APPARATUS

FIELD OF THE INVENTION

The present invention pertains generally to can making apparatus and more specifically to apparatus for trimming the open end of a preformed can body.

SUMMARY OF THE INVENTION

As initially preformed, aluminum or steel can bodies are of non-uniform height and/or have irregular edges at the open end thereof. It is an object of the present invention to provide apparatus for rapidly and accurately shearing an end portion from the open end of a preformed can.

The apparatus of the present invention comprises a spindle unit which is rotated on its horizontal axis and which is revolved in a circular path. Secured to the spindle unit is an annular cutter element and disposed in the path of movement thereof is a stationary cutter element. During motion of the spindle unit, the annular and stationary cutter elements cooperate for sherating an end portion from the open end of a can disposed in a predetermined position over the annular cutter element.

By reason of the indicated shearing arrangement, and as will be explained more fully hereinafter, the edges of trimmed cans are very smooth, cans are trimmed to a uniform height, and cans are processed rapidly: they are positioned for trimming, trimmed, and removed after trimming, while the spindle unit is maintained in continuous motion.

BRIEF DESCRIPTION OF THE DRAWINGS

FIG. 1 is a side elevationsl view of can shearing apparatus incorporating the principles of the present invention;

FIG. 2 is an end view of the can shearing apparatus of FIG. 1;

FIGS. 3, 3A and 3B are three portions of a sectional view taken substantially along the line 3—3 in FIG. 2 looking in the direction indicated by the arrows;

FIG. 4 is a partial view taken substantially along the line 4—4 in FIG. 3 looking in the direction indicated by the arrows; FIG. 5 is a partial sectional view taken substantailly along the line 5—5 in FIG. 3 looking in the direction indicated by the arrows;

FIG. 6 is a partial sectional view taken substantially along the line 6—6 in FIG. 3A looking in the direction indicated by the arrows;

FIG. 11 is a front elevational view of the barrel cam means embodied in the can shearing apparatus of the present invention; and FIG. 12 is a side elevationsl view of the barrel cam means of FIG. 11.

DESCRIPTION OF THE PREFERRED EMBODIMENT

Figure 7:
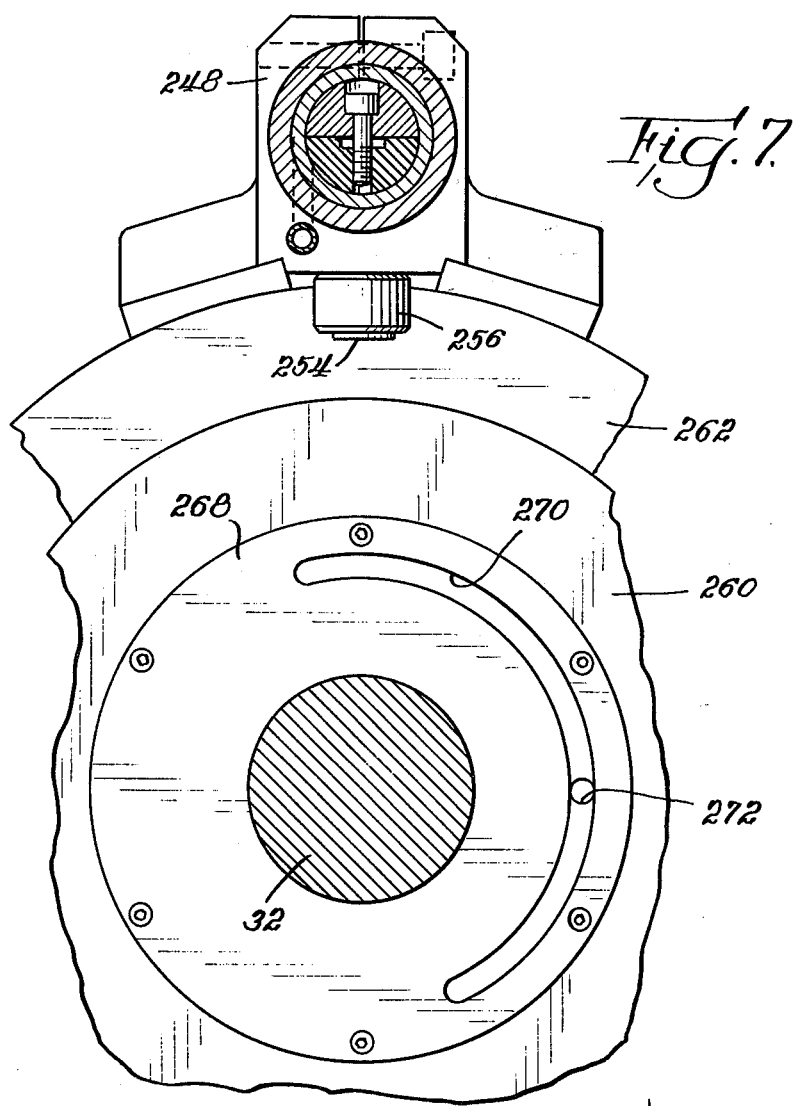
FIG. 7 is a partial sectional view taken substantially along the line 7—7 in FIG. 3B looking in the direction indicated by the arrows.

Referring now to FIGS. 1 and 2, there is indicated generally by the reference numeral 20 can shearing apparatus incorporating the principles of the present invention.

The apparatus 20 includes main frame means comprised of a support frame assembly 22, and a base frame assembly 24 mounted thereon. The base frame assembly 24 is comprised of a horizontal generally rectangular base member or plateform 26 to which are secured first and second upright end frame members 28 and 30. Rotatably mounted in the end frame members 28 and 30. Rotatably mounted in the end frame members 28 and 30, as shown in FIGS. 3 and 3B, is a horizontal main shaft 32. Means for rotating the main shaft 32 (FIGS. 1 and 2) includes a drive unit 34 mounted on the support frame assembly 22 and drivingly connected to the shaft 32 by means of a belt and pulley arrangement 36.

Mounted on the main shaft 32 for rotation therewith (FIGS. 1 and 2) is a turret-like headstock assembly 38 which comprises three circumferentially spaced apart headstock units 40, 42 and 44 secured by clamp bars 45 in the periphery of a central hub 46 (FIGS. 3, 3A and 5) keyed to the main shaft 32. Since the three headstock units are identical in construction and operation, only the headstock unit 40 will be described in detail.

The headstock unit 40 (FIGS. 3, 3A and 4) includes a main tubular spindle housing section 48 and an annular end cap housing section 50. Formed in the housing section 48 are three axial passagewasys 52, 54 and 56 which communicate respectively with radial passageways 58, 60 and 62 formed in the housing section 50. Rotatably mounted in the housing section 48 by means of ball bearing assemblies 64 and 66, and extending axially through the housing sections 48 and 50, is a spindel unit 68.

The spindle unit 68 includes a tubular spindle 70 having a central axial opening 72 and an end section 74 of reduced diameter adjacent the end cap housing section 50. The spindle 70 is formed with a radial passageway 76 which at its inner end communicates with the spindle opening 72 and at its outer end communicates with an annular spindle groove 78 having constant communication with the housing passageway 58. The spindle 70 also is formed with a radial passageway 80 connected at its inner end to a diagonal passageway 82 in turn connected to an axial groove 84 at the periphery of the spindle end section 74. The outer end of the radial spindle passageway 80 communicates with an annular spindle groove 86 having constant communication with the housing passageway 62, while the outer end of the axial spindle groove 86 communicates with an annular spindle groove 88.

Mounted on the spindle end section 74 is a stepped sleeve member 90 which has a radial passageway 92 communicating with the spindle groove 88 and which provides support for a pair of interchangeable annular members 94 and 96. The diameter of the members 94 and 96 is approximately 0.006 inch less than the inner diameter of cans to be trimmed. The outer member 96 serves as an interior cutter element, while the inner member 94 serves as a spacer element. The sleeve member 90 and the elements 94 and 96 are held in place by an annular end cap 97. Axially slidable between the end cap housing section 50 and the spacer and cutter elements 94 and 96 is the body portion of an annular stripper member 98 having a piston head portion 99 slidable along the sleeve member 90. The stripper member 98 is formed with an annular corner groove 100 which communicates with the housing passageway 60, and defines with the sleeve member 90 and spacer element 94 and annular chamber 102 which commumicates with the sleeve passageway 92.

Axially slidable within the spindle opening 72 is a plunger rod 104 having a piston head portion 106 supported by a sleeve bearing 108 secured in one end of the spindle opening 72. The body portion of the plunger rod 104 is supported by a sleeve bearing 110 secured in the other end of the spindle opening 72, and defines with the spindle opening 72 and sleeve bearing 108 an annular chamber 112 which communicates with the spindle passageway 76. The plunger rod 104 is formed with a lengthwise axial passageway 114 open at its right-hand end as viewed in FIG. 3A, an axial end bore 116 (FIG. 3), an intermediate axial bore 118, and radial passageways 120 which communicate with the chamber 112 and open to the intermediate bore 118. Axially slidable in the intermediate bore 118 is a spool valve 122 having a collar portion 124 slidable in the end bore 116 having a stem portion 126. The valve 122 is formed with an annular groove 128, and an L-shaped passageway 130 which communicates with the groove 128 and with the plunger rod passageway 114.

The rotatable end 132 of a rotary air union 134 is secured by a retainer 136 to the end of the spindle 70. When the plunger rod 104 is in its retracted position, the outer end of the valve stem portion 126 abuts the union end 132 to stop leakage of air therefrom and positions the valve 122 to establish communication between the valve groove 128 and the plunger rod passageways 120. When the plunger rod 104 is displaced from its retracted position, a spring 138 within the end bore 116 biases the valve 122 outwardly of the plunger rod 104 whereby to interrupt communication between the valve groove 128 and the plunger rod passageways 120. Secured to the end of the plunger rod 104 exteriorly of the end cap housing section 50 is an annular plunger head 140 formed with a plurality of circumferentially spaced apart ports 141 for equalizing the pressure at the opposite faces of the head 140.

Mounted on the end frame member 28 concentrically of the main shaft 32 (FIG. 3) is an air manifold and gear hub 142 having a radial flange portion 144 to which is secured a ring or sun gear 146. The sun gear 146 has meshing engagement with a planet pinion 148 secured to the spindle 70 of the headstock unit 40, and also has meshing engagement with the corresponding planet pinions of the headstock units 42 and 44. As the main shaft 32 and the headstock units 40 and 42 are rotated about the axis of the main shaft 32, the planet pinion 148 and the corresponding planet pinions of the headstock units 42 and 44 ride about the sun gear 146, whereby the spindle unit 68 and the corresponding spindle units of the headstock units 42 and 44 are rotated about their own axes.

The air manifold 142 (FIGS. 3, 4, 9 and 10) is formed with four axially spaced arcuate grooves 150, 152, 154 and 156, and eight circumferentially spaced L-shaped passageways 158–165. The passageways 158, 160, 162 and 164 at their one ends communicate respectively with the grooves 150, 152, 154 and 156 and at their other ends communicate individually with an axial passageway 166 and three other corresponding passageways formed in the end frame member 28 and connected to a source of air under pressure. The passageways 159, 161, 163 and 165 at their one ends open at the periphery of the manifold 142 respectively in the planes of the grooves 150, 152, 154 and 156, and at their other ends communicate individually with axial passageways (corresponding to the passageway 166) formed in the end frame member 28 and open to the atmosphere.

Rotatably mounted on the air manifold 142 is an annular air distributor head or valve 168 formed with a first set of four radial passageways 170, 172, 174 and 176 aligned respectively in the planes of the manifold grooves 150, 152, 154 and 156 and connected with the headstock unit 40. A section of tubing 178 connects the distributor passageway 170 with the rotatry air union 134; a section of tubing 180 connects the distributor passageway 176 with the spindle housing passageway 52; a section of tubing 182 connects the distributor passageway 174 with the spindle housing passageway 54; and a section of tubing 184 connects the distributor passageway 172 with the spindle housing passageway 56.

The distributor passageway 170, tubing 178 and rotary union 134 serve as first fluid passageway means through which air under pressure is introduced at one side of the piston head portion 106 of the plunder rod 104 when the distributor passageway 170 rotates across the manifold groove 150 for extending the plunger rod 104 and plunger head 140 to the right from the position shown in FIGS. 3 and 3A. Air pressure in the first fluid passageway means is released when the distributor passageway 170 rotates over the maifold passageway 159.

The distributor passageway 176, tubing 180, spindle housing passage 52, end cap housing passageway 58, spindle groove 78 and passageway 76, and annular chamber 112 serve as second fluid passageway means through which air under pressure is introduced at the other side of the piston head portion 106 of the plunger rod 104 when the distributor passageway 176 rotates across the manifold groove 156 for returning the plunger rod 104 to the position shown in FIGS. 3 and 3A. Air pressure in the second fluid passageway means is released when the distributor passageway 176 rotates over the manifold passageway 165.

The distributor passageway 174, tubing 182, spindle housing passageway 54, end cap housing passageway 60, and stripper groove 100 serve as third fluid passagway means through which air under pressure is introduced at one side of the piston head portion 99 of the stripper member 98 when the distributor passageway 174 rotates across the manifold groove 154 for advancing the stripper member 98 to the right from the position shown in FIG. 3A. Air pressure in the third fluid passageway means is released when the distributor passageway 174 rotates over the manifold passageway 163.

The distributor passageway 172, tubing 184, spindle housing passageway 56, end cap housing passageway 62, spindle groove 86 and passageways 80, 82 and 84 and groove 88, sleeve passageway 92 and annular chamber 102 serve as fourth fluid passageway means through which air under pressure is introduced at the other side of the piston head portion 99 of the stripper member 98 when the distributor passageway 172 rotates across the manifold groove 152 for returning the stripper member 98 to the position shown in FIG. 3A. Air pressure in the fourth fluid passageway means is released when the distributor passageway 172 rotates over the manifold passageway 161.

The distributor head 168 is also formed with two additional circumferentially spaced sets of four radial passageways like the passageways 170, 172, 174 anad 176; these additional sets of distributor passageways are connected respectively to the headstock units 42 and 44 by two sets of tubing like the tubing 178, 180, 182 and 184; and the headstock units 42 and 44 are each provided with a set of four fluid passageway means in the same manner as the headstock unit 40.

Supported on the main shaft 32 at the right of the headstock assembly 38 (FIGS. 3A and 6) is a stationary annular cutter support 186 having a hub portion 188 secured to the base member 26 by a strap member 189 (FIG. 1). The outer periphery of the cutter support 186 is formed with an arcuate recess 190 in which is seated and secured an arcuate exterior cutter element or segment 192. The cutter elements 96 and 92 are arranged to effect a shearing action on a can. The arcuate length of the cutter element 192 is equal to the circumference of the cans to be trimmed. Cans to be trimmed may be either aluminum or steel with a wall thickness, for example, of about 0.0035 to 0.006 inch. For satisfactory shearing action, the radial planes of the adjacent edges of the cutter elements 96 and 192 may overlap about 0.002 inch, and the radii of curvature of the adjacent edges of the cutter elements 96 and 192 may have a clearance of about 0.002 inch.

Mounted on the main shaft 32 for rotation therewith at the right of the cutter support 186 (FIG. 3B) is a turret-like tailstock assembly 194 comprising a tailstock plate 196 keyed to the main shaft 32. The tailstock plate 196 carries can support means 198 and three identical circumferentially spaced apart tailstock units 200.

The can support means 198 comprises an axial can support hub 202 which is secured to the plate 196 and which is journaled on the cutter support hub portion 188. Secured to the can support hub 202 are a plurality of axially spaced annular can support disc units 204. Each disc unit 204 (FIG. 6) is formed with three sets of identical circumferentially spaced apart can receiving pockets 206 and adjacent lead-in ramps 208. As shown in FIGS. 1 and 2, the apparatus 20 is provided with a gravity chute 210 for feeding untrimmed cans to the upper portion of the can support means 198, a gravity chute 212 for receiving and discharging trimmed cans from the lower portion of the can support means 198, and a gravity chute 214 for collecting and discharging scrap trimmings.

Each tailstock unit 200 (FIG. 3B) comprises an axial plunger shaft 216 slidably mounted in the tailstock plate 196. The shaft 216 is formed with an axial threaded bore 218, an axial passageway 220, and a radial passageway 222. Secured to one end of the plunger shaft 216 is an axially adjustable plunger head assembly 224 comprised of a head member 226 having an axial threaded stem portion 228, and a thrust bearing unit including a rotatable outer bearing cage 230, an inner bearing cap 232 and intermediate thrust bearings 234. The head member 226 is threaded in the shaft bore 218, is maintained in an axial adjusted position by a lock nut 236, and is formed with an axial threaded bore 238 and an axial passageway 240. The inner bearing cap 232 is secured to the head member 226 by a cap screw 242 which is threaded in the head bore 238 and which is provided with an axial passageway 244. A slight clearance is maintained between the adjacent radial faces of the head member 226 and the outer bearing cage 230.

Secured to the other end of the plunger shaft 216 is cam follower means 246 comprising a frame member 248 in which is formed a radial passageway 250 communicating at its outer end with the radial shaft passageway 222, and an axial passageway 252 communicating at its inner end with the inner end of the passageway 252. Secured in the frame member 248 are a pair of axially spaced radial sleeves 254 on which are rotatably mounted cam rollers 256. Located radially inwardly of the cam follower means 246 is barrel cam means 258 (FIGS. 3B, 11 and 12) comprising an annular body 260 secured to the end frame member 30 and presenting a radial serpentine cam ridge 262. The cam rollers 256 of the tailstock units 200 engage the sides of the cam ridge 262 and ride therealong during rotation of the main shaft 32 and tailstock assembly 194 for effecting axial movement of the tailstock plunger shafts 216 in a predetermined sequence.

The cam support body 260 is formed with an axial passageway 264 which communicates with an axial passageway 266 formed in the end frame member 30 and connected to a source of vacuum. Secured to the side of the cam support body 260 is an annular vacuum manifold plate 268 formed with an arcuate groove 270 (FIG. 7), and an axial passageway 272 which places the groove 270 in communication with the body passageway 264. Mounted on the main shaft 32 for rotation therewith adjacent the manifold plate 268 is a vacuum distributor head or valve 274 formed with an L-shaped passageway 276. The axial leg of the passageway 276 opens at theh face of the manifold plate 268 in line with the arc of the manifold groove 270. The radial leg of the passageway 276 is connected by tubing 278 to the cam follower passageway 252. The distributor head 274 is biased axially into engagement with the manifold plate 268 by expansion means 280 comprising a pressure disc 282 secured to the tailstock plate 196, a pressure disc 284 secured to the distributor head 274, and a plurality of intermediate circumferentially spaced apart springs 286.

The distributor passageway 276, tubing 278, cam follower passageways 252 and 250, plunger shaft passageways 222 and 220 and bore 218, plunger head passageway 240 and bore 238, and screw passageway 244 serve as vacuum passageway means through which a vacuum may be estabilshed at the face of the plunger head assembly 224 when the distributor passageway 276 rotates across the manifold groove 270 for holding the bottom of a can against the face of the plunger head assembly 224. The two other tailstock units 200 are each provided with individual vacuum passageway means in the same manner as the tailstock unit 200 described in detail above and shown in FIG. 3B.

Operationally, the main shaft 32, the headstock assembly 38 and the tailstock assembly 194 are rotated continuously.

As a tail stock unit 200 revovles past the feed chute 210 (FIGS. 1 and 2), it is disposed by the barrel cam means 258 in an axially retracted position indicated by dotted lines in FIG. 3B. From the feed chute 210 a preformed untrimmed can body C is picked up in the dotted-line position shown in FIG. 3B by the adjacent set of can receiving pockets 206 of the can support means 198.

As the tailstock unit 200 revolves between the feed chute 210 (FIG. 2) and the stationary exterior cutter element 192 (FIG. 6), it is extended axially by the barrel cam means 258 from the dotted-line position indicated in FIG. 3B to the solid-line position. The can C is thereby moved axially from the dotted-line position shown in FIG. 3B to the solid-line position with the open end thereof disposed over the annular interior cutter element 96 of the associated spindle unit 68 (FIG. 3). The tailstock unit 200 positively positions the can C for trimming to a precise predetermined height. Concurrently, the plunger head 140 is extended axially by air pressure from the position shown in FIG. 3A to the bottom of the can C whereby to clamp the same against the rotatable outer bearing cage 230 of the tailstock unit 200 (FIG. 3B).

As the tailstock unit 200 and the associated spindle unit 68 revolve past the stationary exterior cutter element 192 (FIGS. 3A and 6), the spindle unit 68 is rotating on its own axis. The can C is thereby simultaneously revolved and rotated, and the annular and stationary cutter elements 96 and 192 (FIG. 3A) cooperate for shearing an end portion from the open end of the can C. The shearing action is such that the edges of the trimmed can C are very smooth.

As the tailstock unit 200 and the associated spindle unit 68 revolve subsequent to the shearing operation, the plunger head 140 is retracted axially by air pressure from the bottom of the can C to the position shown in FIG. 3A. Then, the tailstock unit 200 is retracted axially by the barrel cam means 258 to the dotted-line position indicated in FIG. 3B. The trimmed can C, held by vacuum against the plunger head assembly 224, is retracted axially with the tailstock unit 200 to the dotted-line position shown in FIG. 3B. At about the same time, the stripper member 98 is moved axially by air pressure to the right from the position shown in FIG. 3A, and the scrap ring sheared from the can C is thereby ejected from the spindle unit 68 into the scrap chute 214 (FIG. 2).

Finally, the vacuum holding the trimmed can C against the plunger head assembly 224 is released, the trimmed can C is permitted to drop from the lower portion of the can support means 198 into the discharge chute 212 (FIGS. 1 and 2), and the stripper member 98 is returned axially by air pressure to the position shown in FIG. 3A.

Figure 8:
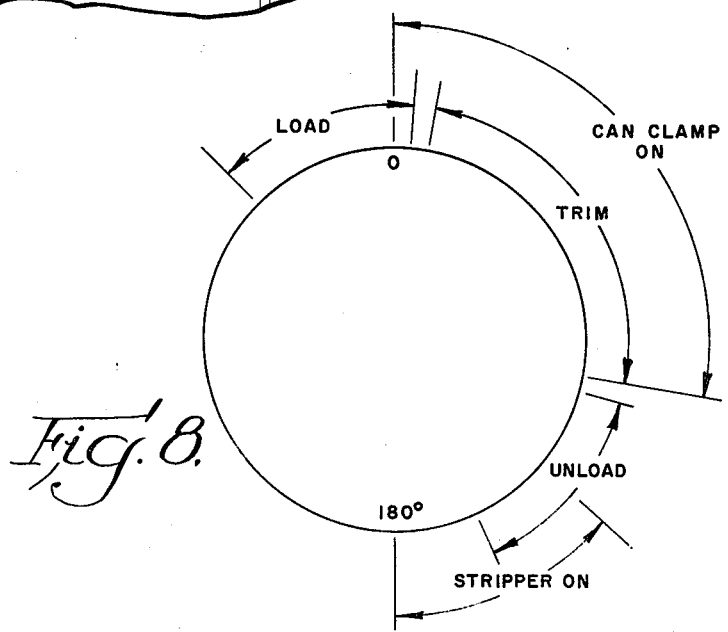
FIG. 8 is a diagrammatic view of one trimming cycle.
Figure 10:
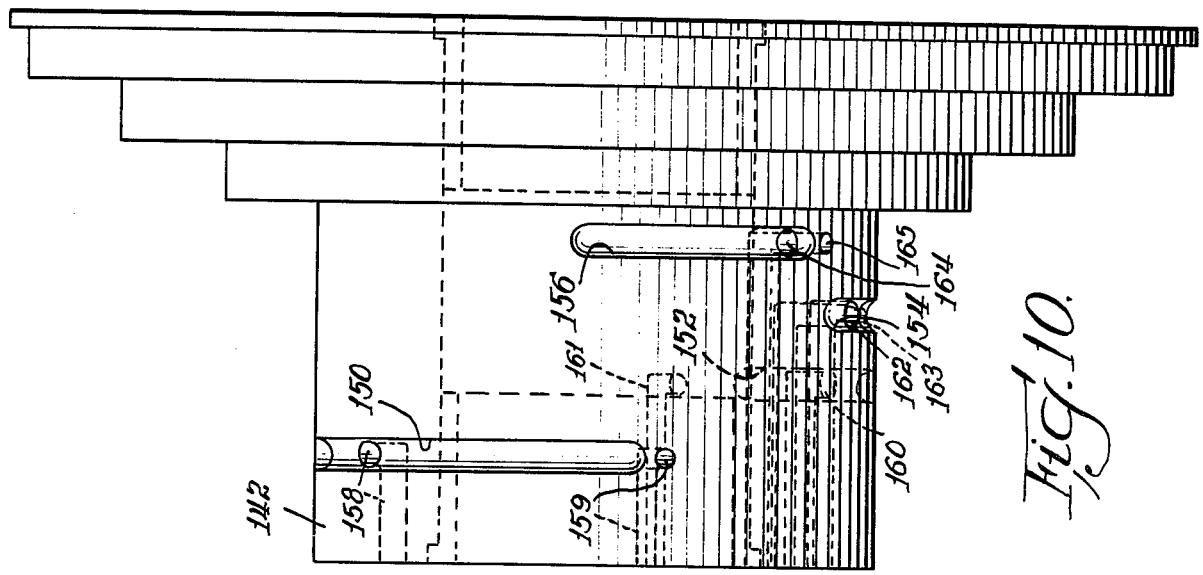
FIG. 10 is a side elevational view of the air manifold and gear hub of FIG. 9.
Figure 9:
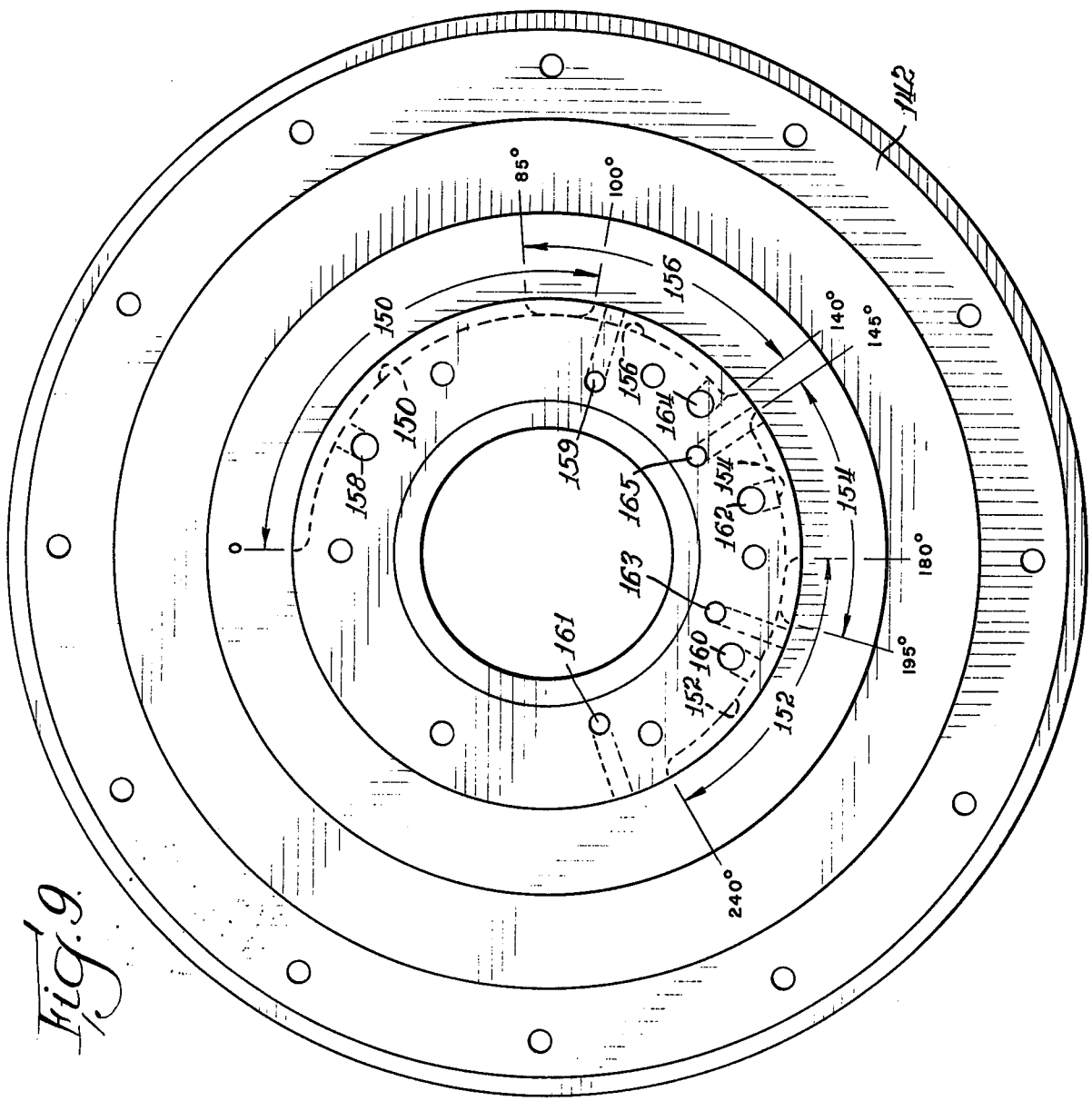
FIG. 9 is a front elevationsl view of the air manifold and gear hub embodiment in the can shearing apparatus of the present invention.

The above described cycle of trimming one can is shown diagrammatically in FIG. 8. This cycle is successively repeated by each of the three headstock units 40, 42 and 44 (and their associated tailstock units 200) in phases 120° apart. Hence, the apparatus 20 serves to shear three cans during each revolution of the continuously rotating main shaft 32. And because cans are positioned for trimming, trimmed, and removed after trimming, while the spindle units 68 of the three headstock units are in continuous motion, the can shearing apparatus 20 has an exceptionally high capacity.

While there has been shown and described a preferred embodiment of the present invention, it will be understood by those skilled in the art that various rearrangements and modifications may be made therein without departing from the spirit and scope of the invention.

The invention claimed is:

1. Can shearing apparatus comprising main frame means, a headstock assembly supported by said main frame means and rotatable about a horizontal axis, at least one horizontal spindle unit rotatably mounted in said headstock assembly on an axis radially spaced from the rotatable axis of the latter, said spindle unit including a tubular spindle, an annular cutter element secured on one end of said tubular spindle, a plunger rod axially slidable in said tubular spindle and having a plunger head adjacent said one end of said tubular spindle, a tailstock assembly supported by said main frame means and rotatable coaxially of said headstock assembly for supporting a can with the open end thereof disposed over said annular cutter element, means for moving said plunger head axially within a can, a stationary cutter element supported by said main frame means, means for conjointly rotating said headstock and tailstock assemblies, and said spindle unit being rotatable on its own axis while said headstock and tailstock are rotating whereby said annular and stationary cutter elements cooperate for shearing an end portion from the open end of a can disposed over said annular cutter element.

2. Can shearing apparatus comprising main frame means, a headstock assembly supported by said main frame means and rotatable about a horizontal axis, a plurality of horizontal spindle units rotatably mounted in said headstock assembly each on an axis radially spaced from the rotatable axis of the latter, an annular cutter element secured to each of said spindle rod for rotation therewith, a plunger ford axially slidable in each of said spindle units with each of said plunger rods having a plunger head, a tailstock assembly supported by said main frame means and rotatable coaxially of said headstock assembly for supporting cans with the open ends thereof disposed over said annular cutter elements, means for moving said plunger heads axially within cans, a stationary cutter element supported by said main frame means, means for conjointly rotating said headstock and tailstock assemblies, and means for rotating said spindle units on their own axes while said headstock and tailstock assemblies are rotating whereby said annular cutter elements successively cooperate with said stationary cutter element for shearing end portions from the open ends of cans disposed over said annular cutter elements.

3. Can shearing apparatus comprising main frame means, a headstock assembly supported by said main frame means and rotatable about a horizontal axis, at least one horizontal spindle unit rotatably mounted in said headstock assembly on an axis radially spaced from the rotatable axis of the latter, said spindle unit including a tubular spindle, an annular cutter element secured on one end of said tubular spindle, a plunger rod axially slidable in said tubular spindle and having a plunger head adjacent said one end of said tubular spindle, a tailstock assembly supported by said main frame means and rotatable coaxially of said headstock assembly for supporting a can with the open end thereof disposed over said annular cutter element, means for moving said plunger head axially within a can, a stationary cutter element supported by said main frame means, means for conjointly rotating said headstock and tailstock assemblies, and means for rotating said spindle unit on its own axis while said headstock and tailstock assemblies are rotating whereby said annular and stationary cutter elements cooperate for shearing an end portion from the open end of a can disposed over said annular cutter element.

4. The can shearing apparatus of claim 3 wherein said means for moving said plunger head comprises first fluid passageway means through which air under pressure may be introduced for moving said plunger head in one direction, and second fluid passageway means through which air under pressure may be introduced for moving said plunger head in the other direction.

5. The can shearing apparatus of claim 4 wherein said spindle unit includes an annular stripper member axially slidable over said annular cutter element; and including means for moving said stripper member relative to said annular cutter element.

6. The can shearing apparatus of claim 5 wherein said means for moving said stripper member comprises third fluid passageway means through which air under pressure may be introduced for moving said stripper member in one direction, and fourth fluid passageway means through which air under pressure may be introduced for moving said stripper member in the other direction.

7. The can shearing apparatus of claim 6 wherein said means for rotating said spindle unit on its own axis comprises a stationary gear concentric of the axis of rotation of said headstock assembly, and a pinion secured to the other end of said tubular spindle and having meshing engagement with said stationary gear.

8. The can shearing apparatus of claim 7 wherein said stationary cutter element is arcuate with an arcuate length equal to the circumference of cans to be sheared.

9. The can shearing apparatus of claim 8 wherein said tailstock assembly comprises can support means having at least one can receiving pocket, an axially slidable tailstock unit with a plunger head assembly at one end thereof for axially moving a can within said can receiving pocket; and including means for axially moving said tailstock unit.

10. The can shearing apparatus of claim 9 wherein said means for axially moving said tailstock unit comprises stationary barrel cam means, and cam follower means secured to said tailstock unit at the other end thereof and engaged with said barrel cam means.

11. The cam shearing apparatus of claim 10 including vacuum passageway means through which a vacuum may be established at said plunger head assembly for holding a can thereagainst.

12. The can shearing apparatus of claim 2 wherein said spindle units include annular stripper members axially slidable over said annular cutter elements; and including means for moving said stripper members relative to said annular cutter elements.

13. The can shearing apparatus of claim 12 wherein said means for moving said stripper members comprises fluid passageway means through which air under pressure may be introduced for moving said stripper members in one direction, and additional fluid passageway means through which air under pressure may be introduced for moving said stripper members in the other direction.

14. The can shearing apparatus of claim 2 wherein said means for rotating said spindle units on their own axes comprises a stationary gear concentric of the axis of rotation of said headstock assembly, and pinions secured to said spindle units and having meshing engagement with said stationary gear.

15. The can shearing apparatus of claim 2 wherein said stationary cutter element is arcuate with an arcuate length equal to the circumference of cans to be sheared.

16. The can shearing apparatus of claim 2 wherein said tailstock assembly comprises can support means having a plurality of can receiving pockets, axially slidable tailstock units with plunger head assemblies at one end thereof for axially moving cans within said can receiving pockets; and including means for axially moving said tailstock units.

17. Can shearing apparatus comprising main frame means, a headstock assembly supported by said main frame means and rotatable about a horizontal axis, at least one horizontal spindle unit rotatably mounted in said headstock assembly on an axis radially spaced from the rotatable axis of the latter, an annular cutter element secured to said spindle unit for rotation therewith, a tailstock assembly supported by said main frame means and rotatable coaxially of said headstock assembly for supporting a can with the open end thereof disposed over said annular cutter element, said tailstock assembly including can support means pocket at least one can receiving pociet and including an axially slidable tailstock unit with a plunger head assembly at one end thereof for axially moving a can within said can receiving pocket, means for axially moving said tailstock unit including stationary barrel cam means and including cam follower means secured to said tailstock unit at the other end thereof and engaged with said barel cam means, a stationary cutter element supported by said main frame means, means for conjointly rotating said headstock and tailstock assemblies, and means for rotating said spindle unit on its own axis while said headstock and tailstock assemblies are rotating whereby said annular and stationary cutter elements cooperate for shearing an end portion from the open end of a can disposed over said annular cutter element.

18. The can shearing apparatus of claim 17 including vacuum passageway means through which a vacuum may be established at said plunger head assembly for holding a can thereagainst.

* * * * *